March 27, 1951 H. E. VAN NESS 2,546,620
ROTARY RAKE
Filed June 7, 1947 2 Sheets-Sheet 1
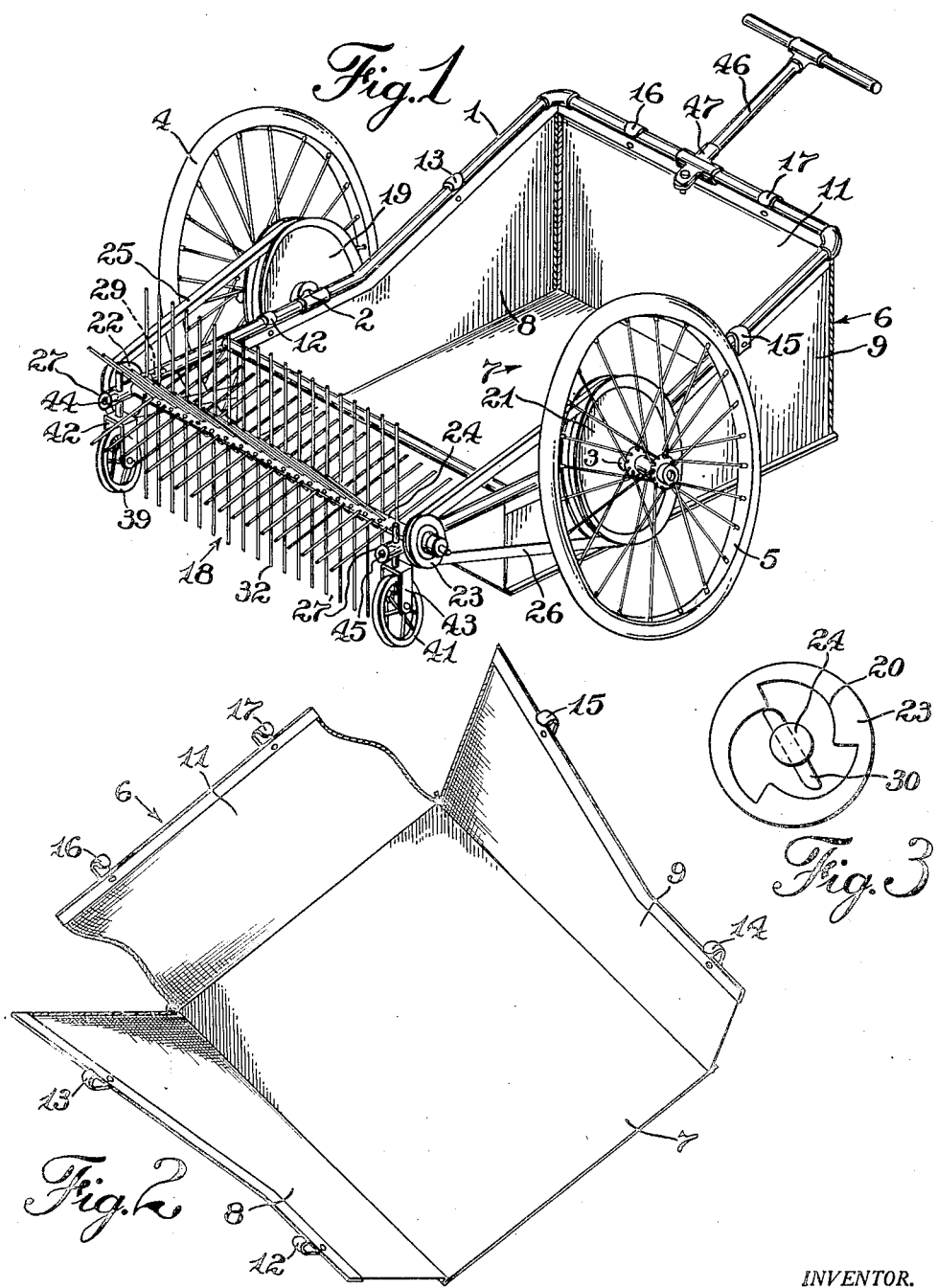
INVENTOR.
Henry E. Van Ness
BY
Clinton S. Janes.
ATTORNEY
WITNESS:
Esther M. Stockton.

March 27, 1951 H. E. VAN NESS 2,546,620
ROTARY RAKE
Filed June 7, 1947 2 Sheets-Sheet 2
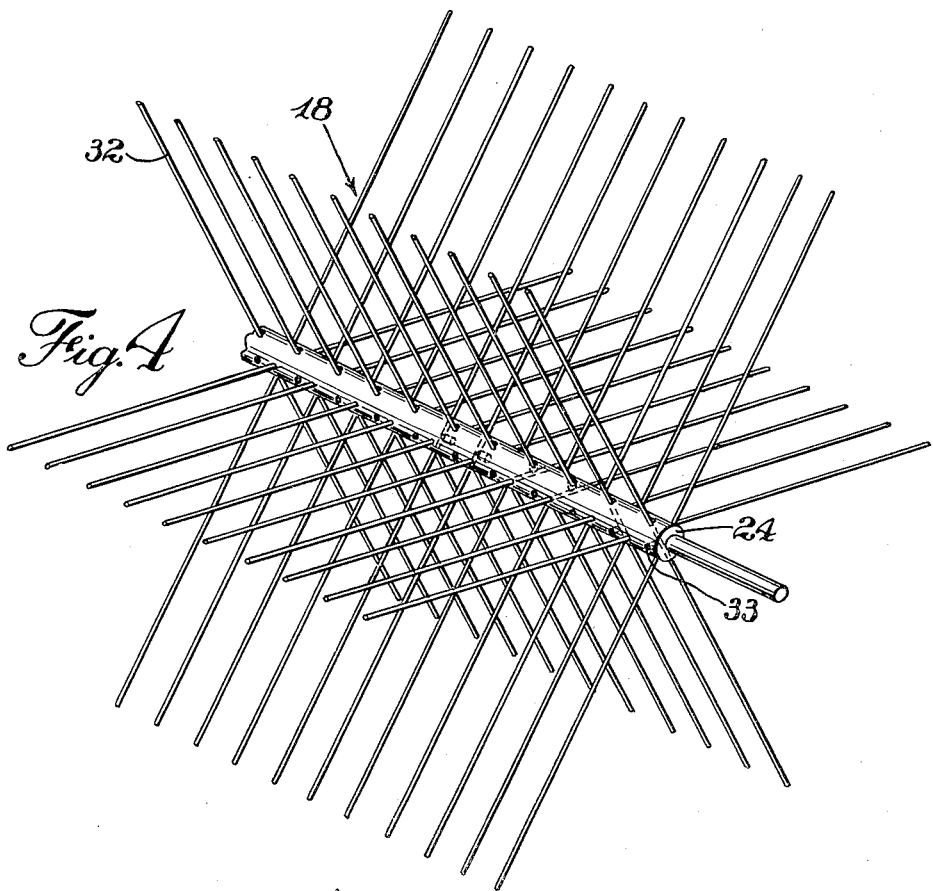
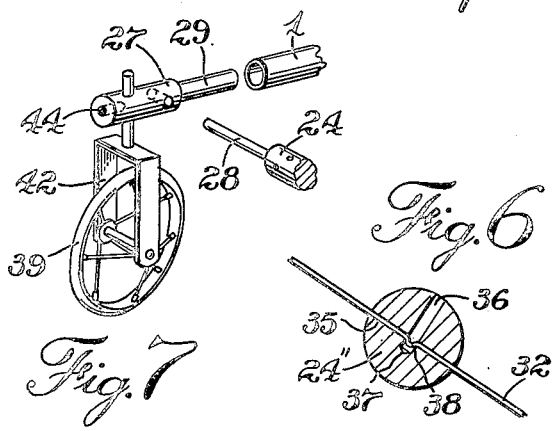
WITNESS:
Esther M. Stockton
INVENTOR.
Henry E. Van Ness
BY
Clinton S. James
ATTORNEY Patented Mar. 27, 1951

2,546,620

UNITED STATES PATENT OFFICE 2,546,620

ROTARY RAKE

Henry E. Van Ness, Elmira, N. Y.

Application June 7, 1947, Serial No. 753,181

3 Claims. (Cl. 56—202)

The present invention relates to a rotary rake, and more particularly to a device for picking up and collecting foreign material such as leaves, cut grass, stones, twigs, scrap of paper, etc. from lawns, golf greens, fairways, etc.

It is an object of the present invention to provide a novel lawn cleaner which is efficient and silent in operation, durable and economical in construction, and convenient to empty or discharge.

It is another object to provide such a device in which the driving and supporting wheels are located close to the axis of balance of the device so as to require very little effort to operate, and to utilize the entire weight of the device to secure traction of the wheels.

It is another object to provide such a device including a hopper and having a rake member at the forward end of the hopper, the hopper being inclined downwardly so that the forward edge contacts the ground when the device is in operation, and being tiltable about the axis of the wheels to raise the rake member for turning, backing up, or to regulate the amount taken from a pile of litter.

It is another object to provide such a device in which the hopper is readily detachable from the frame of the vehicle so as to make a portable container for disposal of the contents.

It is another object to provide such a device in which the rear wall of the hopper has a hinged connection to the bottom and a detachable connection to the sides thereof whereby it may be let down so as to cause the hopper to serve as a chute for discharge of the contents.

It is another object to provide such a device in which the rake member is formed with long elastic tines which throw the collected material toward the rear of the hopper.

It is another object to provide such a device in which the walls of the hopper are formed of flexible material so that the front edge of the hopper may conform to inequalities in the ground by lifting and flexing the sides without becoming detached from the frame.

Further objects and advantages will be apparent from the following description taken in connection with the accompanying drawings in which:

Fig. 1 is a perspective view of a rotary rake constituting a preferred embodiment of the invention;

Fig. 2 is a detail in perspective of the hopper detached from the device and with its rear wall separated from the side walls;

Fig. 3 is an enlarged detail in elevation of a preferred form of over-running clutch used to actuate the rotary rake member;

Fig. 4 is an enlarged detail in perspective of a portion of the rotary rake member illustrating one method of anchoring the spines thereon;

Fig. 5 is a detail in vertical section of the rotary rake member illustrating another method of anchoring the spines therein;

Fig. 6 is an enlarged detail in vertical section of the rotary rake member showing a third method of anchoring the spines; and Fig. 7 is a detail in perspective of one of the guide wheels with its adjustable mounting means, and the means for detachably journaling the rotary rake member on the frame of the vehicle.

In Fig. 1 of the drawing there is illustrated a tubular frame 1 of generally rectangular shape having stub axles 2 and 3 extending laterally therefrom on an axis which is preferably slightly to the rear of the center of the frame. Supporting and driving wheels 4 and 5 are journaled on said stub axles respectively, preferably by means of anti-friction bearings similarly to the wheels of a bicycle.

A hopper indicated generally by numeral 6 comprising a substantially rigid flat bottom 7 vertical sides 8 and 9 and a rear wall 11 is detachably hung on the frame 1 as by means of hooks 12, 13, 14, 15, 16, and 17 whereby the hopper is securely supported by the frame 1, but is readily detachable therefrom by simply lifting the hopper and drawing it rearwardly.

The bottom of the hopper is preferably made of material sufficiently stiff to be self-supporting, but the side and rear walls are constructed of somewhat flexible material such as canvas, attached securely in any suitable way to the bottom of the hopper, the rear wall 11 being detachably connected to the sides 8 and 9 preferably by means of slide fasteners as indicated. By this arrangement, the back wall may be unhooked from the frame by detaching the hooks 16, 17 and released from the side walls 8 and 9 by opening the slide fasteners, whereupon the rear wall may be let down so that the hopper becomes a chute which is convenient for discharge of the collected material without the necessity of handling or lifting either the material or the hopper.

A rotary rake member indicated generally by numeral 18 is journaled on the forward end of the frame 1 on an axis parallel to the shafts 2, 3 and is arranged to be driven from wheels 4, 5 by transmission means comprised driving pulleys 19, 21 on wheels 4 and 5 respectively, driven pulleys 22, 23 on the opposite ends of the rake shaft 24, and belts 25, 26 connecting the pulleys.

It will be understood that the device will operate satisfactorily with a single transmission from one of the driving wheels only, but where the cleaner is to be used in situations requiring considerable maneuvering and turning, it is preferred to use the double transmission so as to drive the rake member from whichever wheel is turning faster. This is accomplished by connecting the driven pulleys 22, 23 to the rake shaft 24 by overrunning clutches such as shown in Fig. 3 where the pulley 23 is provided with a tri-lobate stepped cam recess 20, arranged to cooperate with a key 30 slidably mounted in the shaft 24.

The rake shaft 24 is preferably journaled on the frame in the manner shown in detail in Fig. 7, which shows a bearing member 27 adapted to receive a reduced end portion 28 of shaft 24, and provided with a reduced portion 29 slidably mounted in the end of the frame. A similar bearing member 27' supports the opposite end of shaft 24 whereby the tension of the drive belts retains the bearing members in the frame 1.

The rake elements are comprised of longitudinal rows of tines or spines 32 formed of spring wire such as heavy piano wire extending diametrically through the shaft 24 and rigidly fixed therein. As illustrated in Fig. 4, the spines are anchored in the shaft 24 by means of set screws 33. Another method which has been found efficacious is to form the shaft as a tube as indicated at 24' in Fig. 5, and to draw a cylinder of rubber into the tube so that when released it fits tightly therein. The spines are then forced through the rubber core and are firmly held by the frictional grip of the rubber.

Another method of mounting the spines in the shaft is illustrated in Fig. 6. As there shown the shaft 24" is solid and is drilled diametrically for the spines as shown at 35. A larger hole 36 is drilled at right angles to each of the holes 35 so as to intersect at the center of the shaft, and proceed slightly further in order to form a cup-shaped depression as shown at 37. A spine 32 is then inserted in the opening 35 until it extends equally on both sides of the shaft, and a round pointed punch is entered in the opening 36 and pressed or hammered against the spine so as to deflect it laterally into the cup 37 as shown at 38, thus securely anchoring the spine in the shaft.

Means for supporting the rotary rake with its shaft a suitable distance above the ground to secure proper operation of the rake is shown in the form of a pair of guide wheels 39, 41 rotatably supported in yokes 42, 43 respectively which are adjustably mounted in the bearing members 27 and 27', suitable means such as set screws 44, 45 being provided for holding the guide wheels in adjustment.

As best seen in Fig. 1, the frame 1 slants upwardly from its mid-portion to the rear end, and the sides 8 and 9 of the hopper are correspondingly tapered so that the hopper is considerably deeper at the rear than it is in front. A handle 46 is secured in any suitable way to the rear of the frame 1, preferably by means of an adjustable clamping means such as indicated at 47 which provides adjustment about the horizontal axis of the frame member, and allows the handle to fold into the frame for convenience in shipping etc.

In the operation of the device, when the vehicle is propelled forward the rotation of the supporting and driving wheels 4, 5 is transmitted through the pulleys and belts to the rake shaft 24 whereby the rake is rotated in the direction to pick up and deposit loose material in the hopper. The speed ratio of the gearing is preferably such as to cause the tips of the spines 32 to travel at a peripheral speed considerably higher than that of the wheels 4, 5, whereby the loose material is tossed into the hopper, while the spines pass between the blades of growing grass and comb them out. The arrangement of the spines in axial rows is particularly efficacious for picking up material of all sizes, since twigs will be straightened out crosswise to the vehicle and tossed into the hopper and papers will be seized bodily and projected into the hopper without tearing or shredding which might occur if the spines were otherwise arranged. Pebbles or other solid objects are also thrown directly backward instead of being deflected laterally as they might be if the rows of spines were not axially arranged.

The arrangement of the vehicle so as to be slightly overbalanced in the forward direction causes it to maintain the rake member in proper engagement with the ground without effort on the part of the operator, and to maintain its position when the hopper is removed, to facilitate removal and replacement of the hopper. The flexibility of the side walls of the hopper allows the front edge of the hopper to rise and slide over irregularities in the surface of the ground.

The formation of the frame and hopper so that the rear of the hopper is normally raised a substantial distance above the ground, permits the operator to elevate the rake member by depressing the handle. In this manner, the device is readily maneuvered and turned. This feature is also advantageous when a large deposit of material is to be picked up, since it permits the operator to make repeated passes over the material and collect it effectively without overloading the rake member.

When it is desired to empty the hopper, it may be detached from the frame by lifting it and drawing it rearwardly and the contents then discharged by pouring them from the front of the hopper. When the material does not have to be lifted however it may be conveniently discharged by simply letting down the back of the hopper and raking it out.

Although certain structure has been shown and described in detail it will be understood that various changes may be made in the design and arrangement of the parts without departing from the scope of the invention.

What is claimed is:

1. In a roto rake, a tubular frame of generally rectangular shape having stub axles extending laterally from the sides of the frame, ground engaging wheels journaled on said axles, a hopper having a bottom of self-supporting material and side walls and back wall of flexible material permanently attached to the bottom, and said back wall being detachably connected to the side walls; detachable means supporting the side walls from the sides of the frame, separate detachable means supporting the back wall from the end of the frame, a rotary comb member journaled on the frame in front of the hopper, and transmission means connecting at least one of the driving wheels to the comb member and rotating the comb member in the same direction as the driving wheels and at a higher peripheral speed.

2. In a roto rake a generally rectangular frame having laterally extending stub axles located intermediate the ends thereof, a pair of supporting and driving wheels journaled on the stub axles, a hopper supported on the frame between the wheels, bearing members slidably mounted on the front end of the frame, a rotary shaft journaled in said bearing members parallel to the axles, a speed increasing transmission connecting the driving wheels to the shaft including pulleys mounted on the ends of said shaft, and belts connecting the driving wheels to said pulleys, said belts by their tension serving also as means for retaining said bearing members on the frame; and a plurality of spring wire spines traversing said shaft normal to its axis, forming a plurality of elastic rotary combs; in which the spines are so mounted in the rotary shaft as to form a plurality of axially extending combs equally spaced about the periphery of the shaft.

3. In a roto rake a generally rectangular frame having laterally extending stub axles located intermediate the ends thereof, a pair of supporting and driving wheels journaled on the stub axles, a hopper supported on the frame between the wheels, bearing members slidably mounted on the front end of the frame, a rotary shaft journaled in said bearing members parallel to the axles, a speed increasing transmission connecting the driving wheels to the shaft including pulleys mounted on the ends of said shaft, and belts connecting the driving wheels to said pulleys, said belts by their tension serving also as means for retaining said bearing members on the frame; and a plurality of spring wire spines traversing said shaft normal to its axis, forming a plurality of elastic rotary combs; in which said shaft is in the form of a hollow cylinder having rows of diametrically arranged openings, a core of rubber-like material firmly seated in the cylinder, said spines traversing the openings and piercing the core which thereby serves to firmly anchor the spines in the shaft.

HENRY E. VAN NESS.

REFERENCES CITED

The following references are of record in the file of this patent:

UNITED STATES PATENTS

| Number | Name | Date |
|---|---|---|
| 666,689 | Phillips | Jan. 29, 1901 |
| 680,467 | Shoemaker | Aug. 13, 1901 |
| 939,765 | Walte | Nov. 9, 1909 |
| 1,509,468 | Braun | Sept. 23, 1924 |
| 1,911,535 | Schultze | May 30, 1933 |
| 1,939,385 | Burr | Dec. 12, 1933 |

FOREIGN PATENTS

| Number | Country | Date |
|---|---|---|
| 106,105 | Great Britain | May 17, 1917 |